United States Patent
Butler et al.

(10) Patent No.: US 6,748,010 B1
(45) Date of Patent: Jun. 8, 2004

(54) COMBINED SEARCHING AND PAGE MONITORING USING OFFLINE SAMPLE STORAGE

(75) Inventors: Brian K. Butler, San Diego, CA (US); Haitao Zhang, La Jolla, CA (US); Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/172,067

(22) Filed: Oct. 13, 1998

(51) Int. Cl.$^7$ .................................................. H04B 1/69
(52) U.S. Cl. ...................... 375/148; 375/147; 375/149; 370/311; 370/331; 370/335
(58) Field of Search ................................ 375/148, 149, 375/147, 142, 152; 370/335, 331, 311; 455/434

(56) References Cited

U.S. PATENT DOCUMENTS

| | | | |
|---|---|---|---|
| 5,799,004 A | * 8/1998 | Keskitalo et al. | 370/335 |
| 5,812,543 A | * 9/1998 | Sugita | 370/335 |
| 5,881,058 A | * 3/1999 | Chen | 370/335 |
| 6,101,168 A | * 8/2000 | Chen et al. | 370/228 |
| 6,111,865 A | * 8/2000 | Butler et al. | 370/335 |
| 6,144,649 A | * 11/2000 | Storm et al. | 370/335 |
| 6,243,561 B1 | * 6/2001 | Butler et al. | 455/38.1 |

FOREIGN PATENT DOCUMENTS

| | | | |
|---|---|---|---|
| GB | 2320654 | 6/1998 | ............ H04Q/7/38 |
| WO | 9720446 | 6/1997 | ............ H04Q/7/38 |
| WO | 9854919 | 12/1998 | ............ H04Q/7/20 |

* cited by examiner

*Primary Examiner*—Shuwang Liu
(74) *Attorney, Agent, or Firm*—Philip Wadsworth; Charles Brown; Donald Kordich

(57) ABSTRACT

A novel and improved method for performing paging is described. In one embodiment of the invention a searcher is used to detect spread spectrum signals. Samples received RF signals are stored in a sample buffer. During standby mode, the samples are gathered during paging slots assigned to the mobile. A set of searches are performed on the samples, and if pilot signals are detected additional demodulation is performed to detect paging messages. The resulting set of demodulation data may be combined to increase detection. After a page message has been detected, additional demodulation resources may be activated to processes more complete page messages, or other information channels. In one embodiment of the invention, the searcher includes a demodulator to perform quick page detection without the use of finger elements to reduce idle mode power consumption.

1 Claim, 4 Drawing Sheets

COMBINED SEARCHING AND PAGE MONITORING USING OFFLINE SAMPLE STORAGE

BACKGROUND OF THE INVENTION

I. Field of the Invention

The present invention relates to wireless communications. More particularly, the present invention relates to a novel and improved searcher for detecting page messages in spread spectrum communications.

II. Description of the Related Art

In U.S. patent application Ser. No. 08/316,177 entitled "Multipath Search Processor For A Spread Spectrum Multiple Access Communication System" (The '177 application) a searching for detecting spread spectrum signals is described. The searcher is particularly suited for use in a CDMA based digital cellular telephone system to identify pilot channels transmitted within the CDMA system. Once the pilot channel is identified, the telephone, or "subscriber unit," uses the associated timing information to perform functions such as monitoring for page messages and conducting communications.

The '177 searcher typically works in combination with a set of finger elements and decoder placed on a single integrated circuit. Together, the components perform the processing necessary for CDMA communications and page monitoring. For example, to receive a CDMA signal the searcher does pilot channel searching at various offsets in time. Once a pilot channel is detected, the finger elements are activated to process an associated data channel, such as a paging channel or a traffic channel. To perform the searching and the signal processing, the searcher and finger elements receive samples generated in response to RF signals received by the subscriber unit. The samples are typically generated by an RF/IF unit within the mobile phone or subscriber unit.

In general, it is desirable to reduce the power consumption of a subscriber unit to reduce the battery size and weight. Additionally, it is desirable to increase the reliability with which page and other messages are received and processed by the subscriber unit. It is to this end, as well as other objectives, that the present invention is directed.

SUMMARY OF THE INVENTION

The present invention is a novel and improved method for performing paging. In one embodiment of the invention a searcher is used to detect spread spectrum signals. Samples of received RF signals are stored in a sample buffer. During standby mode, the samples are gathered during paging slots assigned to the mobile. A set of searches are performed on the samples, and if pilot signals are detected additional demodulation is performed to detect paging messages. The resulting set of demodulation data may be combined to increase detection. After a page message has been detected, additional demodulation resources may be activated to processes more complete page messages, or other information channels. In one embodiment of the invention, the searcher includes a demodulator to perform quick page detection without the use of finger elements to reduce idle mode power consumption.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for detecting paging messages is described. The exemplary embodiment described herein is set forth in the context of the digital cellular telephone system. While use within this context is advantageous, different embodiments of the invention may be incorporated in different environments or configurations. In general, the various systems described herein may be formed using software-controlled processors, integrated circuits, or discrete logic, however, implementation in an integrated circuit is preferred. The data, instructions, commands, information, signals, symbols and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
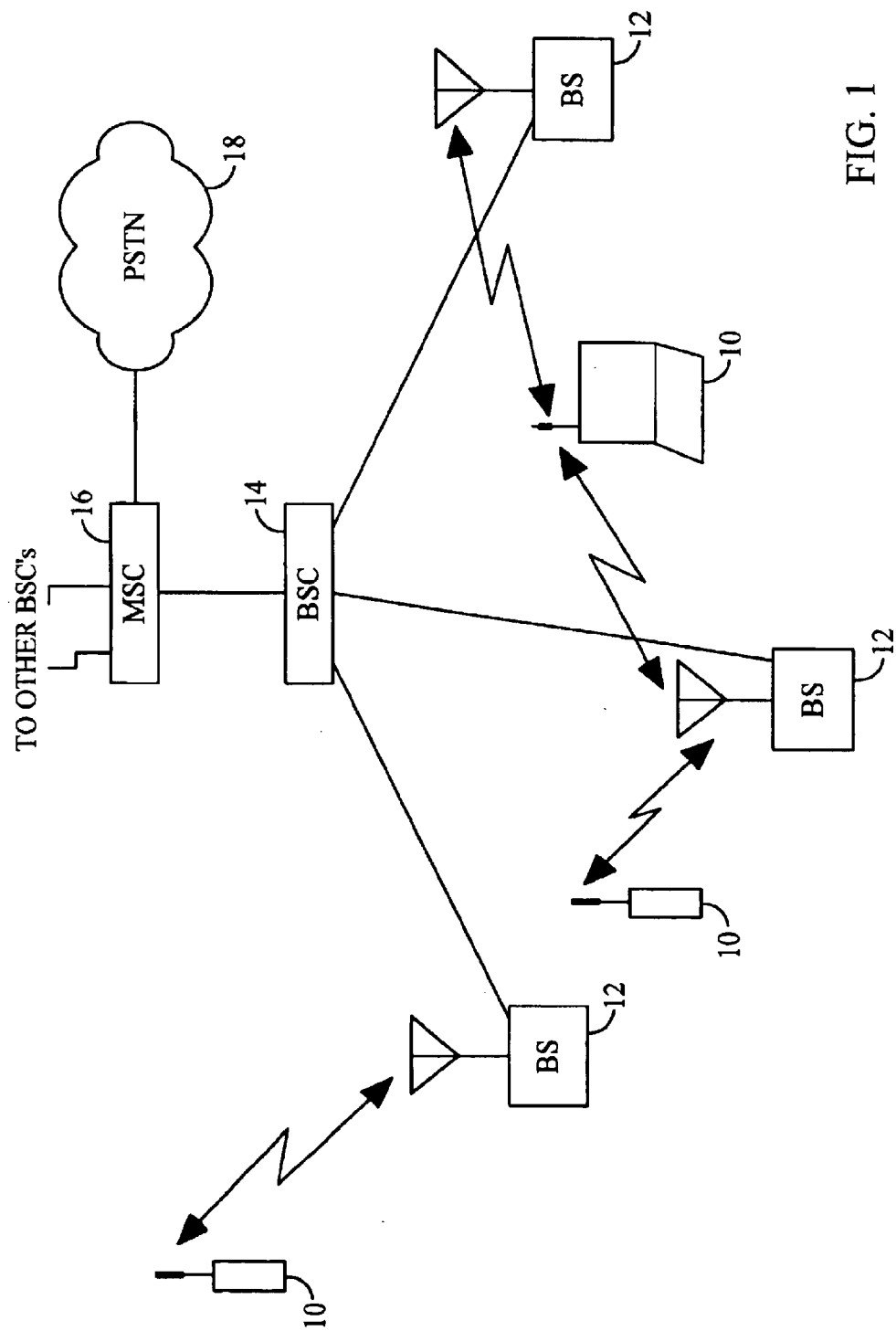
FIG. 1 is a cellular telephone system configured in accordance with one embodiment of the invention.

FIG. 1 is a highly simplified block diagram of a cellular telephone system configured in accordance with the use of present invention. Mobile telephones and other communication systems (subscriber units) 10 are located among base stations 12, which are coupled to base station controller (BSC) 14. Mobile switching center MSC 16 connects BSC 14 to the public switch telephone network (PSTN) 18. During operation, some mobile telephones conduct telephone calls by interfacing with base stations 12 while others are in idle, or standby, mode where they monitor for page messages.

In accordance with the use of some CDMA communications protocols, a subscriber unit 10 can simultaneously interface with two base stations 12 in soft handoff. A system and method for operating a cellular telephone using CDMA techniques is described in U.S. Pat. No. 5,103,459 entitled "System and Method for Generating Signal Waveforms in a CDMA Cellular Telephone System" assigned to the assignee of the present invention and incorporated herein by reference ('459 patent). The system of the '459 patent is configured substantially in accordance with the use of the IS-95 over the air interface standard.

Additionally, in one embodiment of the invention, paging of a subscriber unit 10 is performed substantially in accordance with the paging method described in U.S. patent application Ser. Nos. 08/865,650, and 08/890,355 both entitled "Dual Channel Slotted Paging" assigned to the assignee of the present invention and incorporated herein by reference (the dual channel paging applications). In those patent applications, the use of a quick paging message (quick page) transmitted over a reduced encoding channel is described. One or more quick pages are transmitted before the full page message (full page) to allow a subscriber unit to reduce page monitoring time, and therefore reduce standby power consumption. If the subscriber unit does not receive a positive quick page, then it does not monitor for the full page thereby reducing idle mode power consumption.

Figure 2:
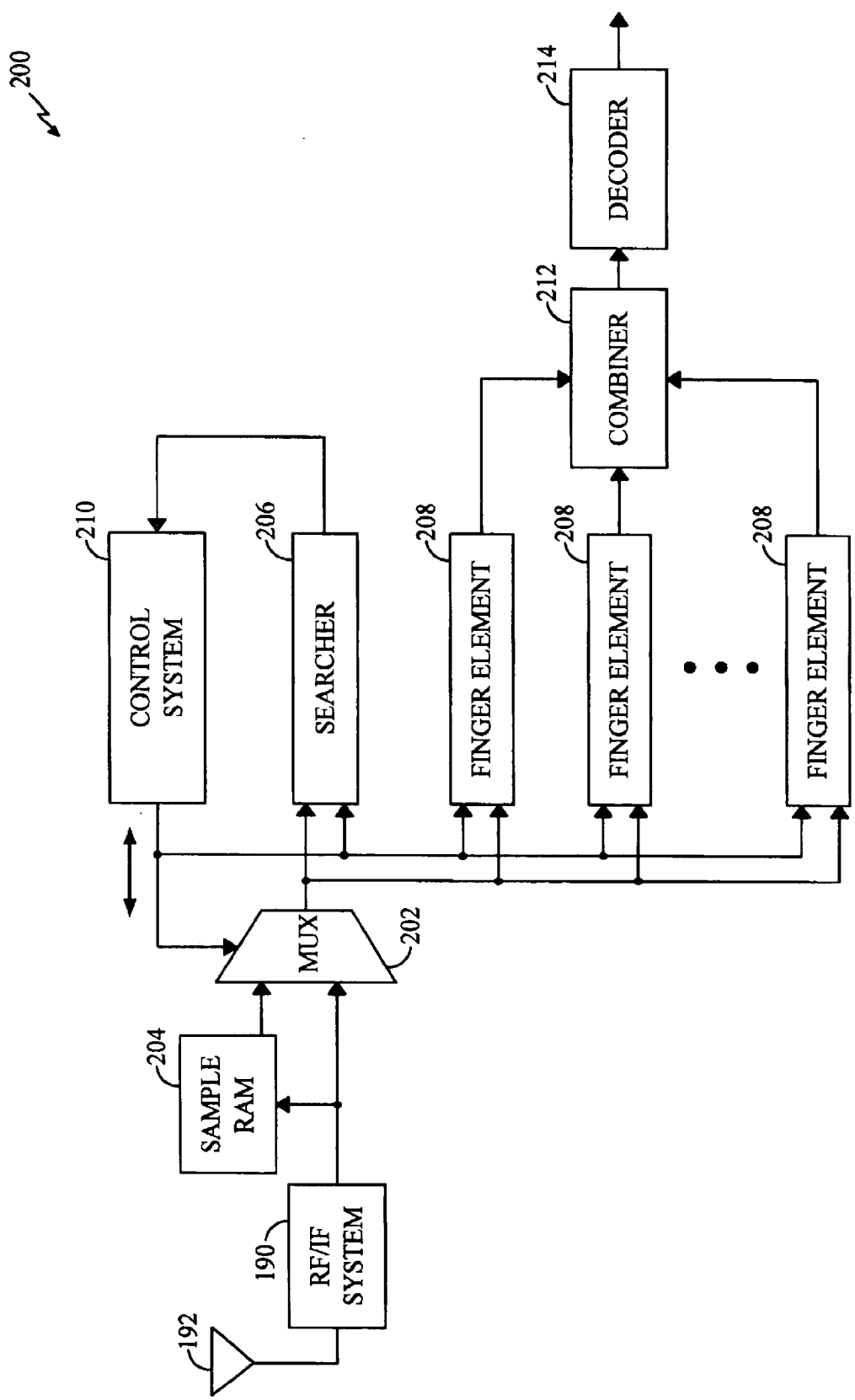
FIG. 2 is a block diagram of a subscriber unit configured in accordance with one embodiment of the invention.

FIG. 2 is a block diagram of a demodulator used for processing CDMA signals in accordance with one embodiment of the invention. Receive (Rx) samples are generated by RF/IF system 190 and antenna system 192, which receive RF signals, filter, downconvert and digitize the RF signals to baseband. The samples are supplied to mux 202 and sample RAM 204. The output of mux 202 is supplied to searcher unit 206 and finger elements 208, which are coupled to control unit 210. Combiner 212 couples decoder 214 to finger elements 208. Typically, control unit 210 is a microprocessor controlled by software, and may be located on the same integrated circuit or on a separate integrated circuit.

During operation, receive samples (samples) are stored in sample RAM 200 and applied to mux 202. Mux 202 supplies either real time samples or the stored sample to searcher unit 206 and finger elements 208. Control unit 210 configures finger elements 208 to perform demodulation at different time offsets based on search results from searcher unit 208. The results of the demodulation are combined and passed to decoder 214, which outputs the data.

In general, the searching performed by searcher 206 uses non-coherent demodulation of the pilot channel to test timing hypotheses corresponding, to various sectors, base stations and multi-paths, while the demodulation performed by finger elements 208 is performed via coherent demodulation of the data channel. Non-coherent demodulation does not require carrier phase information, but detects signal energy rather than the data contained in the signal (for certain waveform types). Coherent demodulation requires phase information, and therefore more information about the signal, but the data transmitted on the signal can be determined. Throughout this application, the term demodulation alone refers to coherent demodulation, while searching refers to non-coherent demodulation. In one embodiment of the invention, despreading is performed by multiplying the received samples with the complex conjugate of the PN sequence and assigned Walsh function at a single timing hypothesis and digitally filtering the resulting samples, often with an integrate and dump accumulator circuit.

In one embodiment of the invention, an enhanced searcher is provided that performs both pilot channel searching and demodulation of a paging channel on the samples stored in sample RAM. The demodulation and searching can be performed at various time offsets, and the results of the demodulation are combined to determine if a page message was received. Preferably, the page channel demodulated by searcher is similar to the quick paging channel described in the dual channel paging applications referenced above. As the message duration is small for quick paging (128 or 256 PN chips at 1.2288 Mcps is 104 or 208 microseconds) and the necessary de-skew is small, (about 100–400 microseconds) the required received samples can be readily buffered and processed "off-line" to save power.

Figure 3:
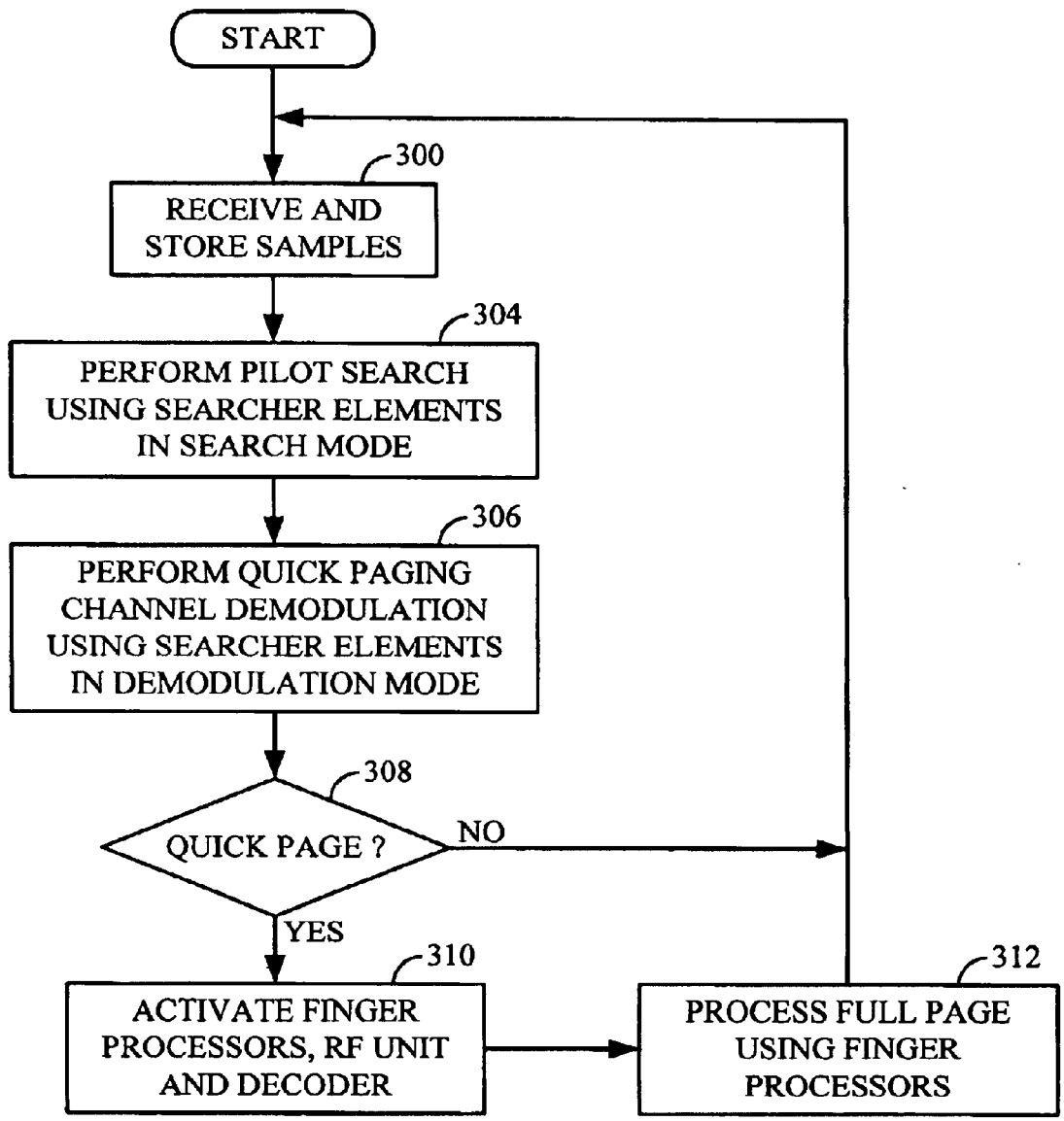
FIG. 3 is a flow chart illustrating the processing performed within a subscriber unit when performed in accordance with one embodiment of the invention.

FIG. 3 is a flow chart illustrating the operation of the demodulator of FIG. 2 during idle mode in accordance with one embodiment of the invention. Idle mode is the state where the subscriber unit is powered up but not making a call. During idle mode the subscriber unit monitors for paging messages directed to it. The paging message may indicate an incoming communication or telephone call. As noted above, the invention is described in the context of a two channel paging system as described in the dual channel paging applications.

At step 300, the subscriber unit collects and stored received samples at step 302 during the quick paging slot assigned to it. In one embodiment, the collection is performed by activating the RF/IF unit 190, storing the samples in the sample RAM, and then deactivating the RF/IF system 190. Typically the subscriber unit collects samples for a longer duration than that of a single quick paging slot so that multiple time offset signals are stored within the set of receive samples.

At step 304 searcher unit 206 (of FIG. 2) performs pilot searching on the stored samples at various time offsets. Additionally, pilot searching may be performed for different signals. For example, searching may be performed for signals from different base stations which use different, or differently offset, pilot codes. When a local maxima is detected above a certain threshold, and the combine function is enabled for the particular search window, the resulting hypothesis is demodulated and combined. Once all the hypotheses in a search list have been completed, the step is done.

In one embodiment of the invention, it is preferable to have sample RAM 302 large enough to cover the time offset of a set of multipath signals. Thus, by simply searching the same set of samples at different offsets, the different pilots are detected. Similarly, the same set of samples may be demodulated at different offsets to process quick pages. While a quick page channel designed for coherent signaling provides better performance, and therefore is preferred in many instances. A quick paging system may be designed for non-coherent signaling as well.

At step 306, searcher 206 is switched to demodulation mode, and the paging channel associated with each signal detected during search mode is demodulated to determine if a quick page has been received. The quick pages are processed by performing coherent demodulation on the set of paging channels corresponding to the set of pilot channels detected during searching. Thus, in one embodiment of the invention the quick page channel is demodulated within the searcher after the searching is performed. Each demodulation is performed at a particular offset within the samples, and the resulting set of demodulation soft decision data is diversity combined using an accumulator within searcher 206.

At step 308 the combined demodulation data is examined to determined if a positive quick page has been received (i.e. one indicating the following full paging message may be directed to this subscriber unit 10). If not, the subscriber unit returns to step 300. If so, the finger elements 208, decoder 214 and RF/IF unit 190 are activated at step 310, and the full page processed at step 312. In an alternative embodiment of the invention, the subscriber unit continues to search the samples for other pilots to find new signals to process when the next paging slot occurs. Additionally, if the quick paging channel was not received with sufficient quality, then step 310 is performed anyway to ensure that a full-page message is not missed.

By performing both the searching and quick page processing within searcher unit 206, the quick paging channel can be monitored without having to activate finger elements until a positive quick page is received. Generally, most quick page messages will be negative, indicating no call or message is pending. Thus, the time the finger elements 208 and other circuitry are activated is significantly reduced. Therefore, reducing the circuitry used to perform quick page channel monitoring increases the standby time of the subscriber unit 10.

This reduction in circuitry is accomplished by taking advantage of the reduced coding level of the quick paging channel and quick page message and storing receive samples for processing. This reduced coding allows the demodulation of the quick paging channel to be performed with a limited amount of demodulation functionality, and therefore with limited additional complexity in the searcher. Also, the use of sample RAM 204 allows multiple time offset demodulation to be performed using a single demodulation engine within searcher 206, which further reduces the circuitry necessary to monitor for paging messages.

Additional power saving are realized by performing the search and page channel monitoring using stored samples. In one embodiment, the quick paging channel is an uncoded BPSK or OOK bit sent once or twice. In particular, the time that the RF/IF unit 190 operates during each page cycle is reduced by storing the samples when they are generated. Once the samples are stored, subscriber unit deactivates the RF/IF unit to conserve power, and searches the samples repeatedly at different offsets or different pilot signals, or both, using only the digital circuitry.

As noted above, performing different searches on the same samples allows the RF unit to turn off once the initial set of samples are gathered. Turning off the RF unit reduces the power consumption of the mobile during idle mode. In contrast, if the samples were not stored, additional samples would have to be gathered for as long as it was necessary to search for the various pilot signals and time offsets. This continuous gathering of pilot data would require the RF unit to remain on, and therefore consuming power, for a longer period of time, which would reduce the stand-by time of the subscriber unit 10.

The described embodiment of the invention provides performance enhancements as well as improved idle mode power consumption. In particular, by performing demodulation and searching on the same set of samples, the performance of the demodulation is improved. This is because the best signals as measured by the pilot channel searching will be the best signals for paging channel demodulation because the set of samples are the same. In alternative systems, searching is performed on a first set of samples and the results of that searching are used to determine how to demodulate paging channels in a second set of samples. While the correspondence between the searching results and paging channel quality is typically reasonable if the time span between the two events is small any difference in the channel between the search and demodulation is virtually eliminated when compared to fading channel decorrelation time by conducting searching and demodulation on the same samples.

Figure 4:
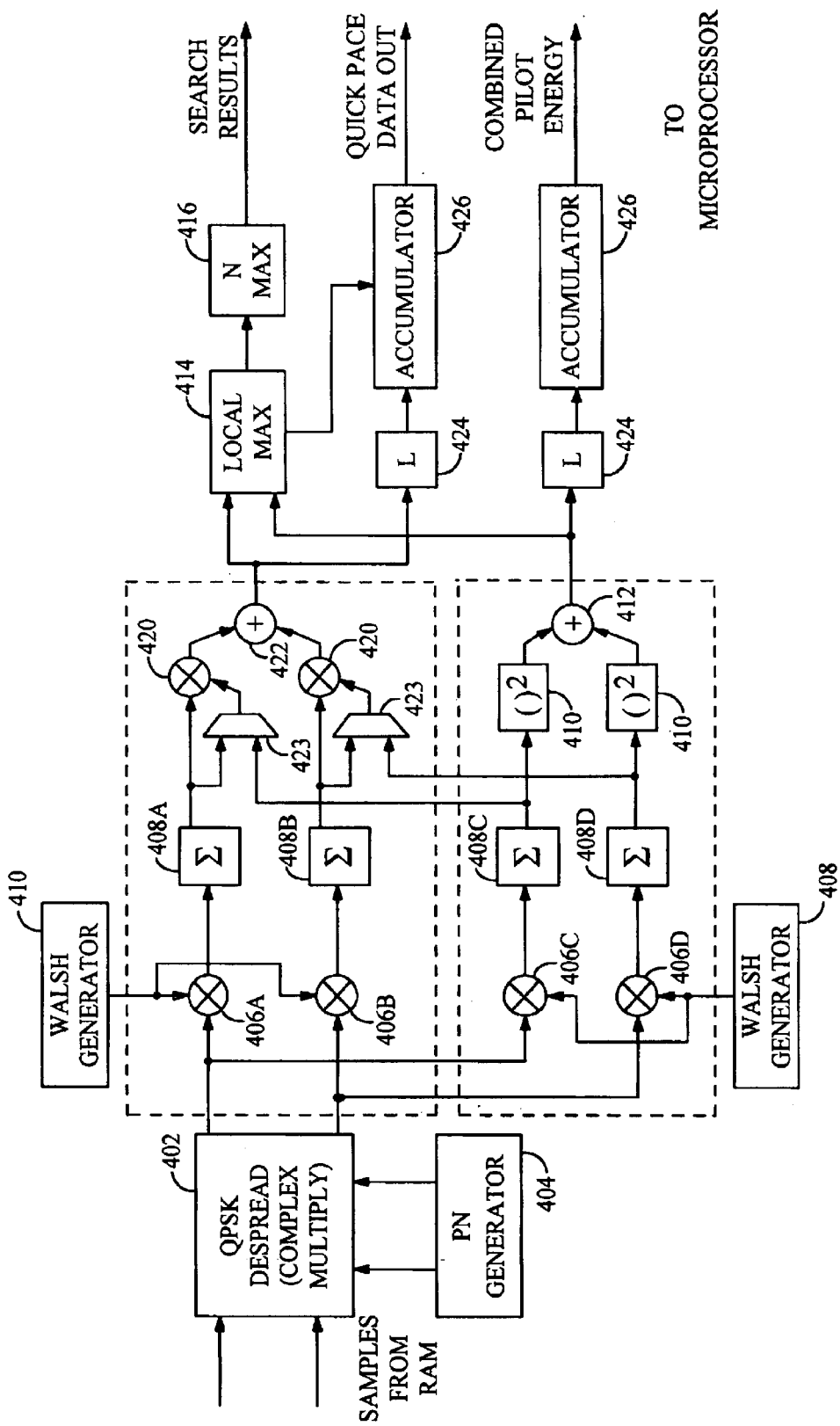
FIG. 4 is a block diagram of a search when configured in accordance with one embodiment of the invention.

FIG. 4 is a block diagram of searcher 206 when configured in accordance of one embodiment of the invention. The in-phase and quadrature phase samples are read from sample RAM 204 (FIG. 2) and despread by QPSK despreader 402 using a PN code from PN code generator 404, where the PN code is comprised of an in-phase portion (PNI) and a quadrature phase portion (PNQ). The resulting in-phase and quadrature phase components from QPSK despreader 402 are applied to multipliers 406a–d. Processing after the sample RAM may happen at arbitrary clock frequencies, such as 19 MHz unrelated to the original chip rate.

During search mode, Walsh code generators 408 and 410 generate the pilot channel Walsh code which is applied to multipliers 406a–406d. Multipliers 406a–406d and accumulators 408a–408d operate together to decover the despread samples with the pilot Walsh code from Pilot Walsh code generator 408. QPSK despreader and WALSH multiply may occur in order, or integrated as a single operation for equivalent results.

The decovered pilot samples from accumulators 408a and 408b are applied to multipliers 420 and 422 twice: once directly and once via multiplexers 422. The result is that the decovered pilot samples are squared, and the squared outputs are summed by summer 412. Thus, in search mode, the dot product of the decovered pilot data is calculated, and therefore the correlation energy of the pilot channel at the current offset.

Similarly, the decovered pilot samples from accumulators 408c and 408d are applied to square circuits 410 the outputs of which are summed by summer 412. Thus, square circuits 410 and summer 412 act to calculate the dot product of the decover pilot data with itself, and therefore the correlation energy of the pilot channel at the current offset.

The dot products from summers 412 and 422 are received by received by local maxima calculator 414. Local maxima calculator 414 determines the most likely offset, or offsets, from a set of offsets (or hypothesis) attempted by the searcher based on the correlation energy. For example, local max calculator 414 may save the local largest energy in a set of oversampled correlation energies in order to isolate the sample nearest the true offset. Multipliers 406a and 406b and accumulators 408a and 408b operate together to decover the despread samples with the quick paging Walsh code from quick page Walsh code generator.

The set of offsets are generated as the timing of the PN and Walsh codes are adjusted relative to the samples. In an exemplary search, the PN and Walsh codes are adjusted in small increments around particular search regions. Typically, the code generators are configured by a control system which also defines the search regions with a start offset and a finish offset. The control system may be a microprocessor or digital signal processor controlled by software stored in memory.

N-max tracker 416 collects the set of N largest correlation energies for the different search regions. N is an integer, preferably in the range 4 to 16. The use of other criteria for collecting search results, such as diversity of signal source, is consistent with the use of the invention. The resulting set of correlation energies and associated offsets (search results) are reported to the control system.

In the exemplary embodiment of the invention, once the search operation has been performed, the control system configures the searcher to perform demodulation on the paging channel for a set of signals and offsets based on the search results. To perform demodulation of the page channel (preferably the quick page channel), Walsh generator 410 is configured to generate the paging channel Walsh code, and multiplexers 423 are configured to apply the output of accumulators 408c and 408d to multipliers 420. Additionally, accumulators 408a and 408b are configured to integrate exactly over the bit duration.

For each signal to be demodulated, the control system configures the PN generator and Walsh generators at the particular offset, and the samples are demodulated again. The quick paging channel decovered samples from accumulators 408a and 408b are applied to multipliers 420. Additionally, the pilot channel decovered samples are applied to multipliers 420 via muxes 423.

To perform the dot product of pilot and paging data, the outputs of multipliers 420 are added by adder 422, and the resulting projected quick paging channel soft decision data is received by latches 424. Various other methods for adjusting for carrier phase will be apparent including the use of a cross product operation or other phase rotation methods. The dot product recovers the data that is in-phase with the pilots & weights it for combining. The output of latches 424 is then received by combiner accumulator 426. For each signal demodulated, accumulator 426 adds in the demodulation results. Once the set of signals are demodulated, the combined quick page data is output to the control system, which estimates the data transmitted by making a hard decision based on the accumulated soft decision data. Based on the hard decision, is determined whether a quick page has been sent.

Additionally, in one embodiment of the invention, the energy from the decovered pilot channel data is calculated again by performing a dot product operation, and the resulting pilot energy is accumulated for each signal by accumulator 426. The accumulated pilot energy is forwarded to the control system.

In one embodiment of the invention, the control system determines whether to rely on the quick paging data based on the accumulated pilot energy. If the accumulated pilot energy is above a certain threshold, then the quick paging channel results are relied on. Otherwise, then next quick page slot is processed, or the full paging channel is processed. As noted above, using the same samples to processing the pilot and paging channels ensures that the channel is the same for the two processings, which improves demodulation performance.

Thus, a system and method for performing page monitoring has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for processing a full page, comprising:

collecting samples of an RF signal for a duration longer then a quick paging slot;

storing the collected samples in a sample RAM;

searching, by a searcher, the stored samples at various time offsets to detect a set of pilot channels;

demodulating, by the searcher, paging channels of the stored samples associated with the detected set of pilot channels;

determining from the demodulated paging channels if a quick page has been received; and when the quick page has been determined, activating finger elements to process the full page.

* * * * *